United States Patent [19]

Shibata

[11] Patent Number: 4,862,381

[45] Date of Patent: Aug. 29, 1989

[54] POSITION CONTROL METHOD IN WHICH A CARTESIAN POINT IS TRANSFORMED THROUGH TWO CARTESIAN COORDINATE SYSTEMS

[75] Inventor: Tomoatsu Shibata, Tokyo, Japan

[73] Assignee: Fanuc Ltd, Minamitsuru, Japan

[21] Appl. No.: 171,868

[22] PCT Filed: Apr. 7, 1987

[86] PCT No.: PCT/JP87/00476

§ 371 Date: Mar. 7, 1988

§ 102(e) Date: Mar. 7, 1988

[87] PCT Pub. No.: WO88/00366

PCT Pub. Date: Jan. 14, 1988

[30] Foreign Application Priority Data

Jul. 9, 1986 [JP] Japan ................. 61-161516

[51] Int. Cl.$^4$ .................... G05B 19/403; G05B 19/41
[52] U.S. Cl. .................... 364/474.36; 364/194
[58] Field of Search .............. 364/167.01, 513, 474.36, 364/731, 815, 194

[56] References Cited

U.S. PATENT DOCUMENTS 4,639,868  1/1987  Tanaka et al. .............. 364/420

FOREIGN PATENT DOCUMENTS 58-94008  6/1983  Japan .
60-126709  7/1985  Japan .
60-252913  12/1985  Japan .

Primary Examiner—Jerry Smith
Assistant Examiner—James J. Kulbaski
Attorney, Agent, or Firm—Staas & Halsey

[57] ABSTRACT

When NC data inputted from an NC data supply unit (1) are data (G68) indicative of a coordinate transformation, a discriminating unit (2a) applies rotational axis vectors, the coordinates of centers of rotation and the angles of rotation, all of which are commanded following the data G68, to a transformation matrix generator (2b) and instructs the latter to generate transformation matrices. In response, the transformation matrix generator (2b) generates coordinate transformation matrices $[M_1]$, $[M_2]$ using the given data. When the NC data are path data, on the other hand, the discriminating unit inputs these data to a coordinate transformation unit (2c), which proceeds to subject the positional coordinates contained in the path data to a coordinate transformation using the transformation matrices $[M_1]$, $[M_2]$ and apply the results to an axis controller (3). The axis controller (3) performs machining by moving a tool along a path obtained by rotations through angles $\theta$, $\phi$ about first and second rotational axes, respectively, based on the position data obtained by the coordinate transformation.

3 Claims, 5 Drawing Sheets

POSITION CONTROL METHOD IN WHICH A CARTESIAN POINT IS TRANSFORMED THROUGH TWO CARTESIAN COORDINATE SYSTEMS

TECHNICAL FIELD

This invention relates to a position control method in which, when a profile on an X-Y plane is rotated through predetermined angles $\theta$, $\phi$ about two respective arbitrary rotational axes, movement of a tool is controlled to perform machining in accordance with the profile at the position obtained by these rotations.

BACKGROUND ART

There are cases where it is required to rotate a machining profile on an X-Y plane about a predetermined rotational axis and perform machining in accordance with the profile at the position to which it has been rotated. For example, as shown in FIG. 4, there are cases where a figure (indicated by the dashed line) PT of a machining profile on the X-Y plane is affixed to an inclined surface ISF of a workpiece WK having an inclination of angle $\theta$ with respect to the X-Y plane, with machining being performed in accordance with the affixed profile PT'.

With reference to FIG. 4, the conventional practice in such case is to create NC path data for machining in accordance with the profile PT in a predetermined program coordinate system (X-Y plane); obtain a central axis vector $(i_o, j_o, k_o)$ along the axis of rotation (X axis), a rotational center point $P_{co}(x_{co}, y_{co}, z_{co})$ on the axis of rotation and the rotational angle $\theta$; subject the position data included in the NC path data to a coordinate transformation based on a coordinate transformation matrix determined by the central axis vector, the rotational center point and the rotational angle; control the position of a tool based on position data obtained as a result of the coordinate transformation; and perform machining in accordance with a command by moving the tool along the path PT' obtained as a result of the rotation by angle $\theta$ about the rotational axis (X axis).

There are also cases in which, when the profile on the X-Y plane is rotated through predetermined angles $\theta$, $\phi$ about two respective arbitrary rotational axes, it is desired to perform machining in accordance with the profile at the position obtained as a result of these rotations. For example, with reference to FIG. 5, there are cases where the X-Y plane is rotated by $\theta$ about the X axis, a plane $X_1$-$Y_1$ obtained by this rotation is rotated by $\phi$ about a $Y_1$ axis to obtain a plane $X_2$-$Y_2$, the matching profile figure PT in the X-Y plane is affixed in the plane $X_2$-$Y_2$, and machining is performed in accordance with the affixed profile PT'' using NC path data defined in terms of the X-Y plane.

However, in the prior art, such machining on a plane obtained as the result of two rotations is possible only when the rotational center point of the initial rotational axis and the rotational center point of the next rotational axis coincide (in FIG. 5, the centers of rotation coincide since both are $P_{co}$). In other words, if the centers of rotation coincide, then a coordinate transformation is applied to coordinates (x,y,z) in accordance with the equation $$\begin{bmatrix} x' \\ y' \\ z' \end{bmatrix} = [M_1] \cdot [M_2] \begin{bmatrix} x \\ y \\ z \end{bmatrix} + \begin{bmatrix} x_{co} \\ y_{co} \\ z_{co} \end{bmatrix}$$

to obtain post-rotational coordinates (x',y',z'), and machining in the post-rotational plane is possible using the last-mentioned coordinates. It should be noted that $[M_1]$, $[M_2]$ are matrices based on first and second rotations.

Conventionally, however, if the machining profile PT in the X-Y plane is affixed on a plane (see plane PL in FIG. 6) obtained by two rotations in a case where the rotational center points do not coincide, machining in accordance with the profile PT'' is impossible using the path data for the X-Y plane.

SUMMARY OF THE INVENTION

Accordingly, an object of the present invention is to provide a position control method through which machining can be performed on a plane, which has been obtained by two rotations, using path data for the X-Y plane even if the rotational center points do not coincide.

The position control method of the present invention includes a step of obtaining, in a program coordinate system, a central axis vector $(i_o, j_o, k_o)$ of a first rotational axis, coordinates $(x_{co}, y_{co}, z_{co})$ of a rotational center point on the first rotational axis, and an angle of rotation $\theta$, and defining a central axis vector $(i_1, j_1, k_1)$ of a second rotational axis in a new three-dimensional coordinate system decided by rotation through $\theta$, coordinates $(x_{c1}, y_{c1}, z_{c1})$ of a rotational center point on the second rotational axis, and an angle of rotation $\theta$, a step of deciding a matrix $[M_1]$ for calculating coordinates $(x_1, y_1, z_1)$ obtained when coordinates (x,y,z) in the program coordinate system are rotated by $\theta$ about the first rotational axis, and a matrix $[M_2]$ for calculating coordinates $(x_2, y_2, z_2)$ obtained when coordinates $(x_1, y_1, z_1)$ in the new three-dimensional coordinate system are rotated by $\theta$ about the second rotational axis, and a step of performing machining by moving a movable element along a path obtained by rotations through $\theta$, $\phi$ about the first and second rotational axes, respectively, based on position data (x',y',z') obtained by subjecting the position data (x,y,z) to a coordinate transformation in accordance with the following equation:

$$\begin{pmatrix} x' \\ y' \\ z' \end{pmatrix} = [M_1] \cdot [M_2] \begin{pmatrix} x \\ y \\ z \end{pmatrix} + [M1] \begin{pmatrix} x_{c1} \\ y_{c1} \\ z_{c1} \end{pmatrix} + \begin{pmatrix} x_{co} \\ y_{co} \\ z_{co} \end{pmatrix}$$

DESCRIPTION OF THE PREFERRED EMBODIMENT

Figure 1:
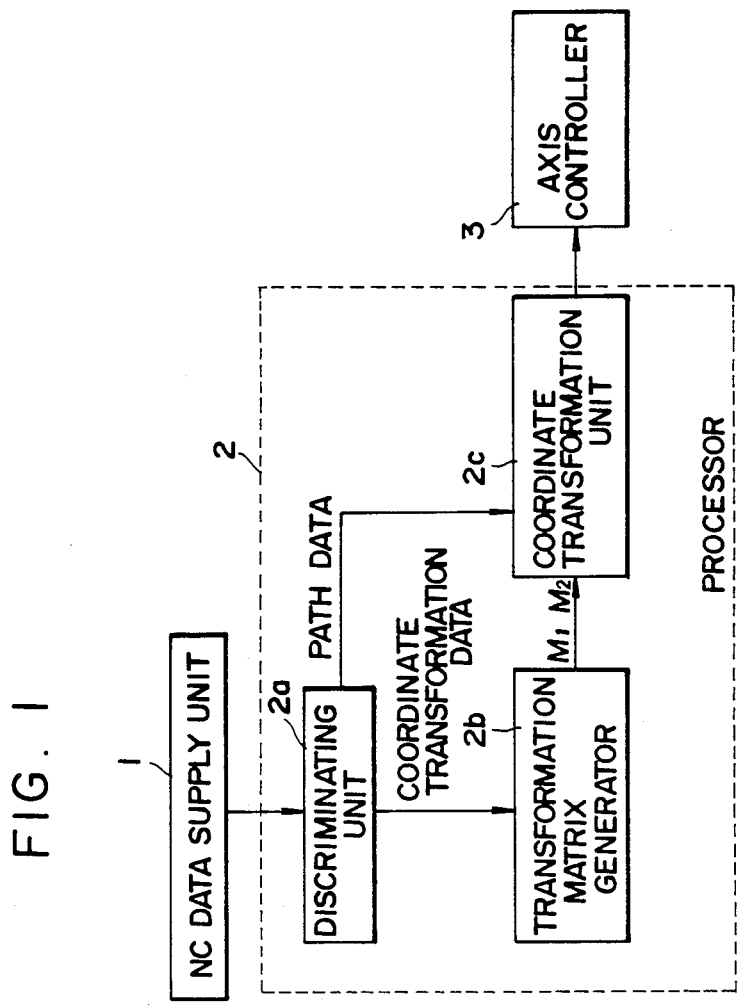
FIG. 1 is a view for describing the general features of the present invention.

FIG. 1 is a view for describing the general features of the present invention, in which numeral 1 denotes an NC data supply unit, 2 a processor and 3 an axis controller. The processor has a discriminating unit 2a, a transformation matrix generator 2b and a coordinate transformation unit 2c.

NC data are inputted from the NC data supply unit 1. If the inputted data are data (G68) indicative of a coordinate transformation, the discriminating unit 2a provides rotational axis vectors, the coordinates of the centers of rotation and the angles of rotation (all of which are commanded following G68), to the transformation matrix generator 2b and instructs the latter to generate transforming matrices. In response, the transformation matrix generator 2b generates coordinate transformation matrices $[M_1]$, $[M_2]$ using the given data.

If the NC data are path data, on the other hand, the discriminating unit 2a inputs these data to the coordinate transformation unit 2c, which proceeds to subject the positional coordinates contained in the path data to a coordinate transformation using the transformation matrices $[M_1]$, $[M_2]$ and to apply the results to the axis controller 3. The axis controller 3 performs machining by moving a tool along a path obtained by rotations through angles $\theta$, $\phi$ about first and second rotational axes, respectively, based on the position data obtained by the coordinate transformation.

Figure 2:
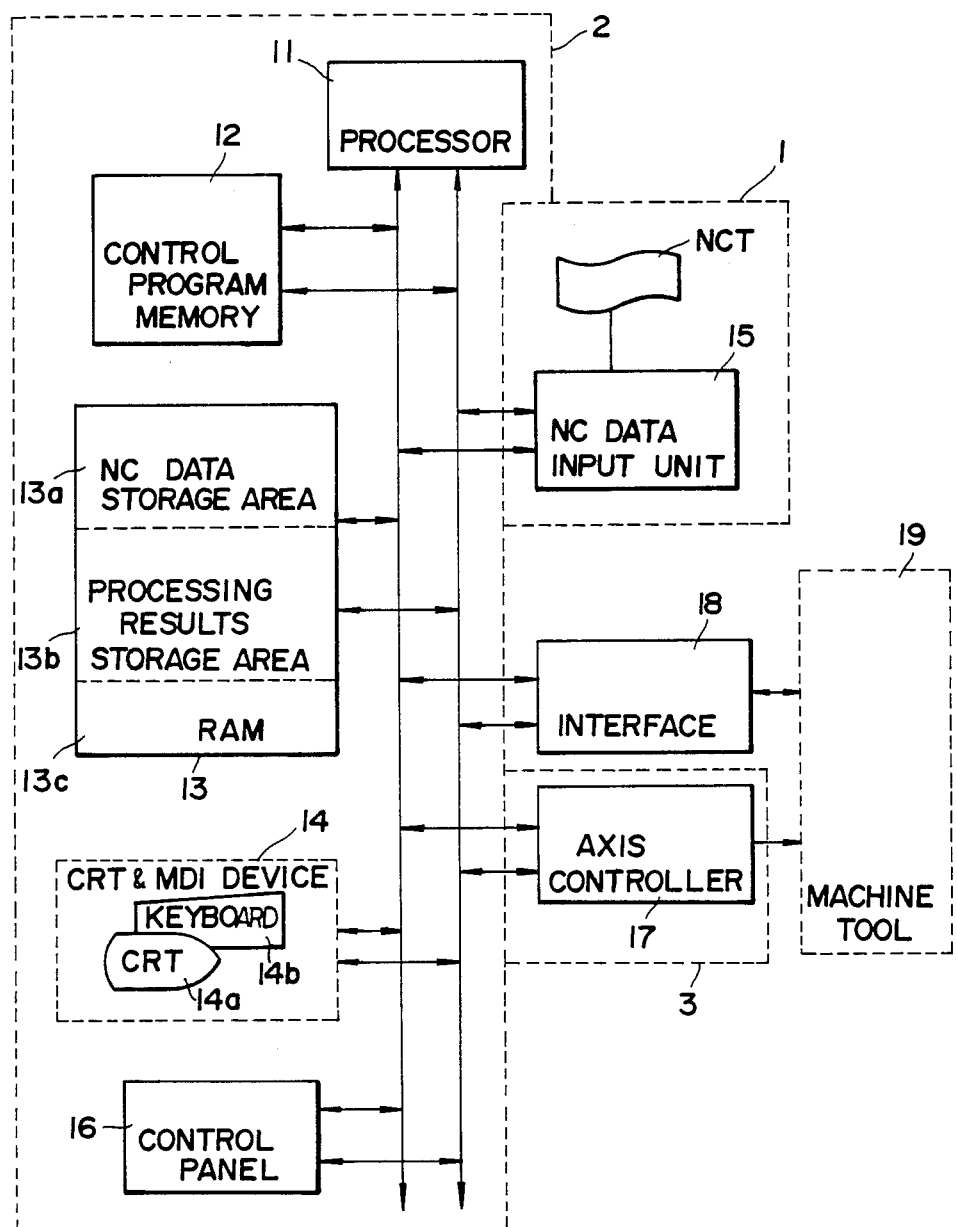
FIG. 2 is a block diagram of an NC apparatus for practicing the present invention.
Figure 3:
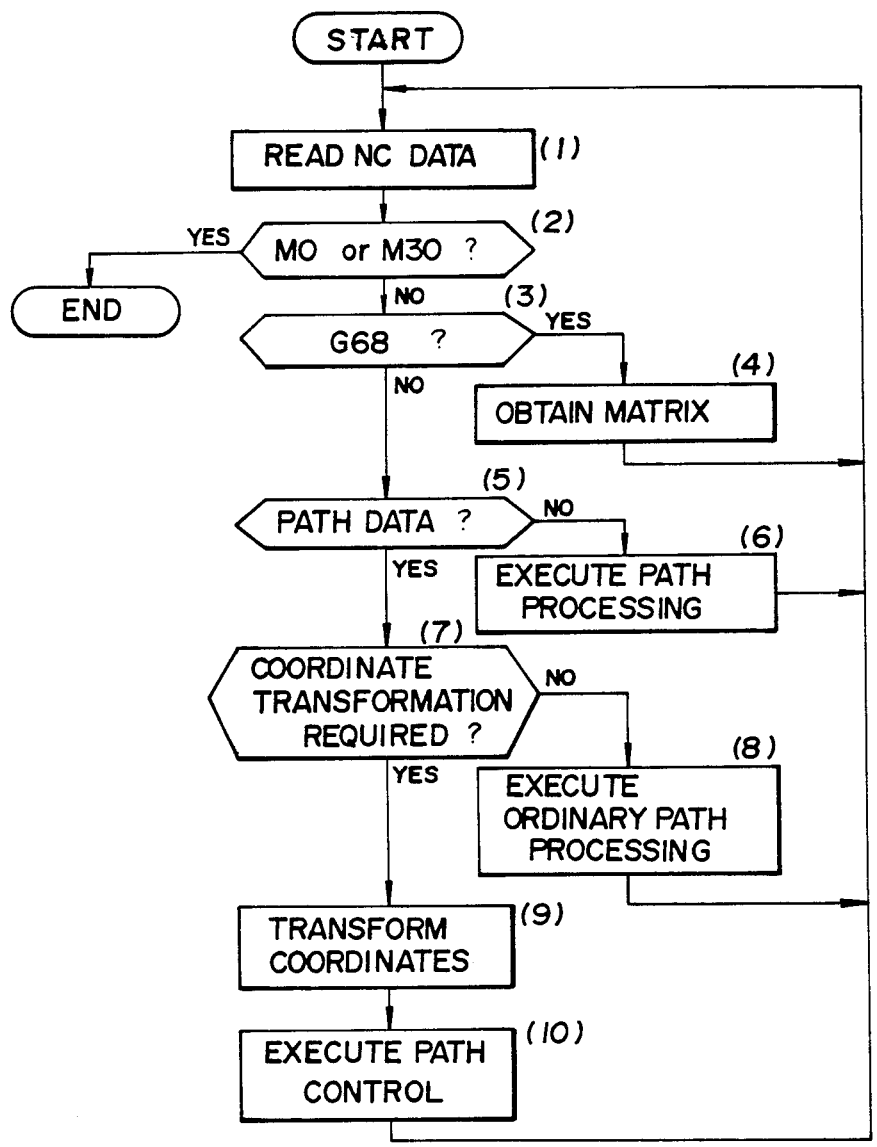
FIG. 3 is a flowchart of processing according to the present invention.
Figure 4:
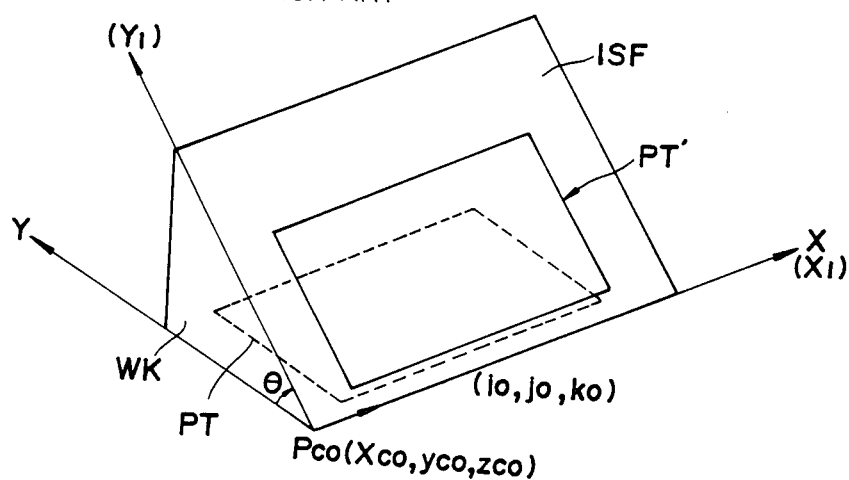
FIGS. 4 and 5 are views for describing the conventional method.
Figure 5:
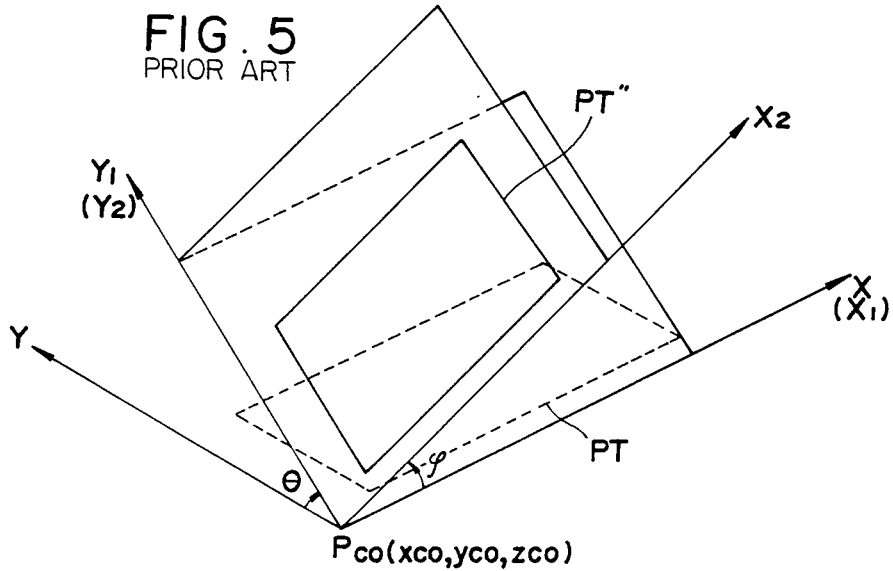
Figure 6:
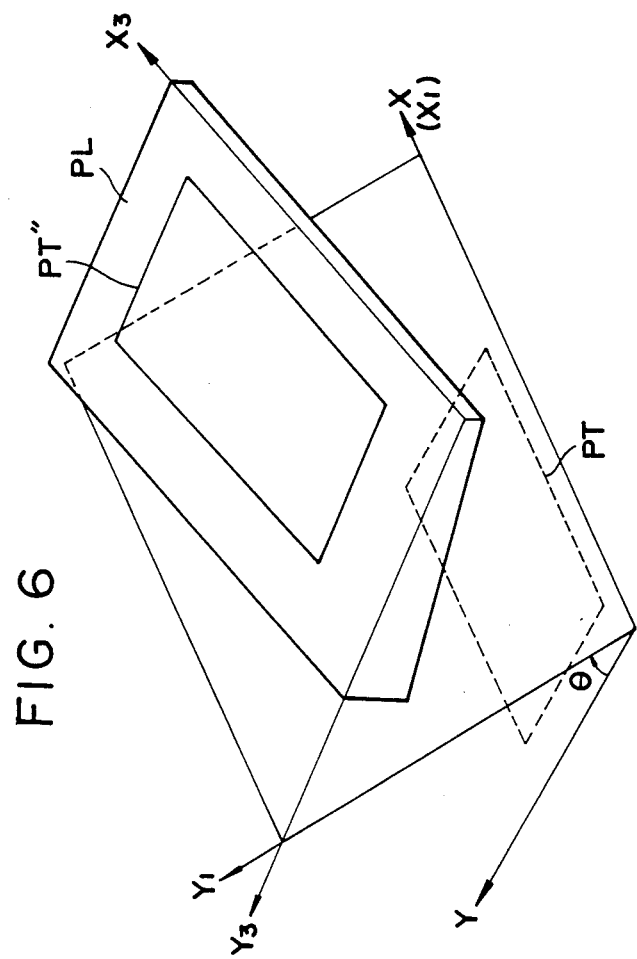
FIG. 6 is a view for describing two rotated planes having different centers of rotation.

FIG. 2 is a block diagram of an NC apparatus for practicing the present invention, and FIG. 3 is a flowchart of processing for implementing the present invention.

In FIG. 2, numeral 11 denotes a processor, 12 a control program memory (ROM), 13 a RAM backed up by a battery and having an NC data storage area 13a, a storage area 13b for the results of processing, and a storage area 13c for other data.

Numeral 14 denotes a CRT & MDI unit having a CRT 14a and a data input device (keyboard) 14b. Numeral 15 designates an NC data input unit for reading NC data from an external storage medium NCT and transferring the data to the NC data storage area 13a of RAM 13. Numeral 16 denotes a control panel, and 17 an axis controller. Portions similar to those shown in FIG. 1 are designated by like reference characters.

The axis controller 17 has a pulse interpolator and a servo-circuit for each axis, though these are not illustrated. When path control is performed based on the NC data, the axis controller 17 is provided, by the processor 11 at time intervals $\Delta T$, with amounts of movement to be performed along each axis during the time interval the controller 17 generates distributed pulses by performing a well-known pulse distribution operation based on the amounts of movement, and controls movement along each axis based on the distributed pulses.

Numeral 18 denotes an interface circuit for administering an exchange of data between the NC apparatus and a machine tool, and numeral 19 represents the machine tool.

Processing for the method of the present invention will now be described in accordance with FIGS. 2 and 3. It should be noted that an NC program is assumed to have already been transferred to and stored in the storage area 13a of RAM 13.

(1) When a start button on the control panel 16 is pressed, the processor 11 reads the NC data out of the RAM 13 one block at a time under the control of a control program stored in the ROM 12.

It is assumed that the path data have been created in an X-Y-Z coordinate system in accordance with a machining graphic drawn in the X-Y-Z coordinate system. Further, in case of a single rotation, the following NC data:

$$G68Xx_{co}Yy_{co}Zz_{co}Ii_oJj_oKk_oR\theta; \quad (a)$$

indicating rotation of the coordinate system are inserted into the NC program at an appropriate location (generally in front of the path data). In case of two rotations, the following are inserted:

$$G68Xx_{co}Yy_{co}Zz_{co}Ii_oJj_oKk_oR\theta; \quad (a)$$

$$G68Xx_{cl}Yy_{cl}Zz_{cl}Ii_lJj_lKk_lR\phi; \quad (b)$$

where G68 is a F-function instruction for commanding coordinate system rotation, the alphabetic characters X, Y and Z are word address words specifying the coordinates of a center of rotation, the aliphatic characters I, J and K are word address words specifing a rotational axis vector, and $\theta$, $\phi$ are angles of rotation. In case of two rotations, the coordinates and vector given by (b) are values in a coordinate system $X_1$-$Y_1$-$Z_1$ generated by the initial rotation.

(2) The processor 11 checks whether a read item of NC data is M02, which indicates program end, or M30. If program end is indicated, the processor ends processing.

(3) If it is not the end of the program, the processor checks whether the data includes "G68".

(4) If "G68" is included, a transformation matrix is calculated. Let (i,j,k) present a central axis vector, $(x_o,y_o,z_o)$ the coordinates of the center of rotation at a point on the central axis, $\theta$ the angle of rotation, and (x,y,z) the coordinates before rotation. Coordinates (x',y',z') after rotation will then be obtained in accordance with the following equation:

$$\begin{bmatrix} x' \\ y' \\ z' \end{bmatrix} = [M] \begin{bmatrix} x - x_o \\ y - y_o \\ z - z_o \end{bmatrix} + \begin{bmatrix} x_o \\ y_o \\ z_o \end{bmatrix} \quad (1)$$

Therefore, the transformation matrix [M] is calculated using the data that follows "G68". It should be noted that the transformation matrix [M] is given by the following:

$$[M] = \begin{bmatrix} r_{11} & r_{12} & r_{13} \\ r_{21} & r_{22} & 2_{13} \\ r_{31} & r_{32} & r_{33} \end{bmatrix}$$

$r_{11} = n_1^2 + (1 - n_1^2) \cdot \cos\theta$ $r_{12} = n_1 \cdot n_2 \cdot (1 - \cos\theta) - n_3 \cdot \sin\theta$ $r_{13} = n_1 \cdot n_3 \cdot (1 - \cos\theta) + n_2 \cdot \sin\theta$ $r_{21} = n_1 \cdot n_2 \cdot (1 - \cos\theta) - n_3 \cdot \sin\theta$ $r_{22} = n_2^2 + (1 - n_2^2) \cdot \cos\theta$ $r_{23} = n_2 \cdot n_3 \cdot (1 - \cos\theta) - n_1 \cdot \sin\theta$ $r_{31} = n_1 \cdot n_3 \cdot (1 - \cos\theta) - n_2 \cdot \sin\theta$ $r_{32} = n_2 \cdot n_3 \cdot (1 - \cos\theta) + n_1 \cdot \sin\theta$ $r_{33} = n_3^2 + (1 - n_3^2) \cdot \cos\theta$ $n_1 = i / \sqrt{i^2 + j^2 + k^2}$ $n_2 = j / \sqrt{i^2 + j^2 + k^2}$ $n_3 = k / \sqrt{i^2 + j^2 + k^2}$ The matrix [M] obtained by the first rotation is found as [M₁], and the matrix [M] obtained by the second rotation is found as [M₂]. Thereafter, the program returns to step (1) and the next item of NC data is read.

(5) If an item of data is not "G68" at step (3), the processor 11 checks whether the item of NC data is path data.

(6) If the data is not path data (if the data is an M-, S- or T-function instruction), then ordinary processing conforming to the command is executed and the next item of data is read.

(7) If the data is path data, on the other hand, it is checked whether a coordinate transformation in accordance with "G68" has already been commanded.

(8) If "G68" has not been commanded and a coordinate transformation is unnecessary, ordinary path control is executed and the next item of NC data is read.

(9) If "G68" has been commanded, however, target position coordinates (x,y,z) contained in the path data are subjected to a coordinate transformation using the transformation matrix already obtained.

More specifically, in case of one rotation, the operation [M₁]→[M] is performed and the coordinates (x',y',z') prevailing after the rotation are obtained in accordance with Eq. (1).

In case of two rotations, the coordinates (x',y',z') prevailing after two rotations are obtained in accordance with the following equation:

$$\begin{bmatrix} x' \\ y' \\ z' \end{bmatrix} = [M_1][M_2] \begin{bmatrix} x \\ y \\ z \end{bmatrix} + [M1] \begin{bmatrix} x_{cl} \\ y_{cl} \\ z_{cl} \end{bmatrix} + \begin{bmatrix} x_{co} \\ y_{co} \\ z_{co} \end{bmatrix} \quad (2)$$

(10) When the coordinates coordinates (x',y',z') prevailing after the rotation have been found, path control is performed using these coordinates. That is, amounts of movement along respective axes over a predetermined time period ΔT are obtained and these amounts of axial movement are inputted to the axis controller 17 every ΔT.

In response, the axis controller 17 performs a pulse interpolation operation to execute serve-control along each axis based on the pulses obtained.

When path control ends, the processor 11 reads the next items of NC data and repeats the foregoing processing.

In accordance with the present invention, it is arranged to obtain coordinates acquired by rotations through $\theta$ and $\phi$ about two respective axes on the basis of the coordinate transformation equation (2), and to control the movement of a tool based on these coordinates. As a result, it is possible to perform machining on a plane obtained by two rotations using path data in the X-Y plane even if rotational center points do not coincide.

I claim:

1. A position control method for performing pulse distribution processing based on position data coordinates (x, y, z) in a three-dimensional program coordinate system, and controlling the position of a movable element on the basis of data obtained by said pulse distribution processing, comprising:

a first step of obtaining, in the program coordinate system, a central axis vector ($i_o$, $j_o$, $k_o$) of a first rotational axis, coordinates ($x_{co}$, $y_{co}$, $z_{co}$) of a rotational center point on said first rotational axis, and an angle of rotation $\theta$, and defining a central axis vector ($i_1$, $j_1$, $k_1$) of a second rotational axis in a new three-dimensional coordinate system determined by rotation of the program coordinate system through $\theta$, coordinates ($x_{c1}$, $y_{c1}$, $z_{c1}$) of a rotational center point on said second rotational axis, and an angle of rotation $\phi$;

a second step of calculating a transformation matrix [M₁] using the central axis vector ($i_o$, $j_o$, $k_o$) of the first rotational axis and $\theta$, wherein coordinates ($x_1$, $y_1$, $z_1$) in the new three-dimensional coordinate system are obtained, when coordinates (x, y, z) in the program coordinate system are rotated by $\theta$ about the first rotational axis, in accordance with the following equation:

$$\begin{pmatrix} x' \\ y' \\ z' \end{pmatrix} + [M_1] \begin{pmatrix} x - x_{co} \\ y - y_{co} \\ z - z_{co} \end{pmatrix} + \begin{pmatrix} x_{co} \\ y_{co} \\ z_{co} \end{pmatrix}$$

and calculating a transformation matrix [M₂] using the central axis vector ($i_1$, $j_1$, $k_1$) and $\phi$, wherein coordinates ($x_2$, $y_2$, $z_2$) are obtained, when the new three-dimensional coordinate system is rotated by $\phi$ about the second rotational axis, in accordance with the following equation:

$$\begin{pmatrix} x_2 \\ y_2 \\ z_2 \end{pmatrix} = [M_2] \begin{pmatrix} x_1 - x_{c1} \\ y_1 - y_{c1} \\ z_1 - z_{c1} \end{pmatrix} + \begin{pmatrix} x_{c1} \\ y_{c1} \\ z_{c1} \end{pmatrix}$$

a third step of transforming the position data coordinates (x, y, z) in accordance with the following equation:

$$\begin{pmatrix} x' \\ y' \\ z' \end{pmatrix} = [M_1] \cdot [M_2] \begin{pmatrix} x \\ y \\ z \end{pmatrix} + [M1] \begin{pmatrix} x_{c1} \\ y_{c1} \\ z_{c1} \end{pmatrix} + \begin{pmatrix} x_{co} \\ y_{co} \\ z_{co} \end{pmatrix}$$

and a fourth step of moving a movable element along a path based on the transformed position data (x', y', z').

2. A position control method according to claim 1, wherein the central axis vector ($i_o$, $j_o$, $k_o$), the coordinates ($X_{co}$, $Y_{co}$, $Z_{co}$), the angle rotation $\theta$, the central axis vector ($i_1$, $j_i$, $k_1$), the coordinates ($X_{c1}$, $Y_{c1}$, $Z_{c1}$) and the angle of rotation $\phi$ are specified by a predetermined G-code.

3. A position control method according to claim 2, wherein the step of controlling movement of the movable element based on the position data coordinates is performed after said G-code is received.

* * * * *